US011901962B2

United States Patent

Suni et al.

(12) United States Patent
(10) Patent No.: US 11,901,962 B2
(45) Date of Patent: Feb. 13, 2024

(54) APPARATUS FOR RADIO CARRIER ANALYZATION

(71) Applicant: Nokia Solutions and Networks Oy, Espoo (FI)

(72) Inventors: Eetu Suni, Oulu (FI); Juha Hannula, Kiiminki (FI)

(73) Assignee: Nokia Solutions and Networks Oy, Espoo (FI)

( * ) Notice: Subject to any disclaimer, the term of this patent is extended or adjusted under 35 U.S.C. 154(b) by 342 days.

(21) Appl. No.: 17/293,777

(22) PCT Filed: Nov. 13, 2018

(86) PCT No.: PCT/EP2018/081018

§ 371 (c)(1), (2) Date: May 13, 2021

(87) PCT Pub. No.: WO2020/098913

PCT Pub. Date: May 22, 2020

(65) Prior Publication Data

US 2022/0006538 A1 Jan. 6, 2022

(51) Int. Cl.
*H04B 17/23* (2015.01)
*H04B 1/10* (2006.01)
*H04W 24/08* (2009.01)

(52) U.S. Cl.
CPC ........... *H04B 17/23* (2015.01); *H04B 1/1027* (2013.01); *H04W 24/08* (2013.01)

(58) Field of Classification Search
CPC ...... H04B 17/23; H04B 1/1027; H04W 24/08
See application file for complete search history.

(56) References Cited

U.S. PATENT DOCUMENTS 5,493,515 A 2/1996 Batchelder et al.
9,292,951 B2 3/2016 Mulé et al.
(Continued)

FOREIGN PATENT DOCUMENTS

CN 1853364 A 10/2006
CN 102356661 A 2/2012
(Continued)

OTHER PUBLICATIONS

Office action received for corresponding Chinese Patent Application No. 201880099467.2, dated Jan. 27, 2022, 7 pages of office action and no page of translation available.

(Continued)

*Primary Examiner* — Ajay Cattungal
(74) *Attorney, Agent, or Firm* — Harrington & Smith

(57) ABSTRACT

A solution for radio signal analyzation in an apparatus in a radio access network, comprises receiving (408) continuously wirelessly from one or more transceivers radio frequency parameters related to one or more radio signals received or transmitted by the transceivers, the parameters designating the quality and properties of the radio signals. The one or more radio signals are transformed (410) to a corresponding number of signal wave forms having a given amplitude, frequency and smoothness where the amplitude, frequency and smoothness of each wave form is controlled based on the received radio frequency parameters of the corresponding signal. The one or more of the signal wave forms are displayed (412).

17 Claims, 4 Drawing Sheets

(56) References Cited

U.S. PATENT DOCUMENTS

| | | | | |
|---|---|---|---|---|
| 2012/0287797 | A1* | 11/2012 | Basson | H04W 16/28 370/252 |
| 2013/0246616 | A1* | 9/2013 | Park | H04L 47/19 709/224 |
| 2015/0327092 | A1 | 11/2015 | Martch | |
| 2018/0123906 | A1 | 5/2018 | Liao et al. | |
| 2018/0316748 | A9* | 11/2018 | Ding | H04W 8/005 |
| 2018/0376427 | A1* | 12/2018 | Arzelier | H04W 52/0277 |
| 2019/0236600 | A1* | 8/2019 | Glendenning | H04B 17/318 |
| 2020/0205062 | A1* | 6/2020 | Azizi | H04W 52/0264 |
| 2020/0344800 | A1* | 10/2020 | Reuche | H04W 24/10 |

FOREIGN PATENT DOCUMENTS

| | | | |
|---|---|---|---|
| CN | 102396265 | A | 3/2012 |
| CN | 103033824 | A | 4/2013 |
| CN | 103975628 | A | 8/2014 |
| GB | 2352589 | A | 1/2001 |
| WO | 2005/029735 | A1 | 3/2005 |
| WO | 2017/096082 | A1 | 6/2017 |
| WO | 2018/067306 | A1 | 4/2018 |
| WO | 2020/098911 | A1 | 5/2020 |
| WO | 2020/098912 | A1 | 5/2020 |

OTHER PUBLICATIONS

Notice of Allowance received for corresponding Chinese Patent Application No. 201880099467.2, dated Jan. 4, 2023, 4 pages of office action and 2 pages of translation available.

Qingmin et al., "Timing Design of High Speed Synchronous Bus", Systems Engineering and Electronics, vol. 22, No. 11, 2000, pp. 84-87.

Office action received for corresponding European Patent Application No. 18803406.0, dated Mar. 7, 2023, 5 pages.

"Imprint Invisible Sound and Radio Waves Onto Your Retina: Augmented Reality with Perfect Alignmen", Instructables, Retrieved on May 21, 2021, Webpage available at : http://www.instructables.com/id/Imprint-Invisible-Sound-and-Radio-Waves-Onto-Your-/.

Kolsch et al., "Touching the Visualized Invisible: Wearable AR with a Multimodal Interface", University of California, 2004, 24 pages.

International Search Report and Written Opinion received for corresponding Patent Cooperation Treaty Application No. PCT/EP2018/081018, dated Aug. 14, 2019, 13 pages.

Office action received for corresponding Chinese Patent Application No. 201880099467.2, dated Sep. 5, 2022, 5 pages of office action and no page of translation available.

* cited by examiner

APPARATUS FOR RADIO CARRIER ANALYZATION

RELATED APPLICATION

This application was originally filed as PCT Application No. PCT/EP2018/081018, filed on Nov. 13, 2018, of which is incorporated herein by reference in its entirety.

TECHNICAL FIELD

The exemplary and non-limiting embodiments relate to analysing radio carrier properties.

BACKGROUND

Wireless telecommunication systems are complex systems and monitoring the operation of a system is important so that possible problems may be detected and corrected with as small delays as possible. Therefore performance analysis of the system should be efficient and easy for maintenance and research personnel.

In wireless communication systems the quality and operation of radio connections is of vital importance. Performance data is available from the connections. However, as the number of simultaneous connections is large and the amount of data to be analyses is large, the performance analysis is a challenging task.

BRIEF DESCRIPTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there are provided apparatuses of claims 1, 11, 13 and 14.

According to an aspect of the present invention, there are provided methods of claims 15 and 25.

BRIEF DESCRIPTION OF DRAWINGS

One or more examples of implementations are set forth in more detail in the accompanying drawings and the description below. Other features will be apparent from the description and drawings, and from the claims.

DETAILED DESCRIPTION OF SOME EMBODIMENTS

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (such as IEEE 802.11 based WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
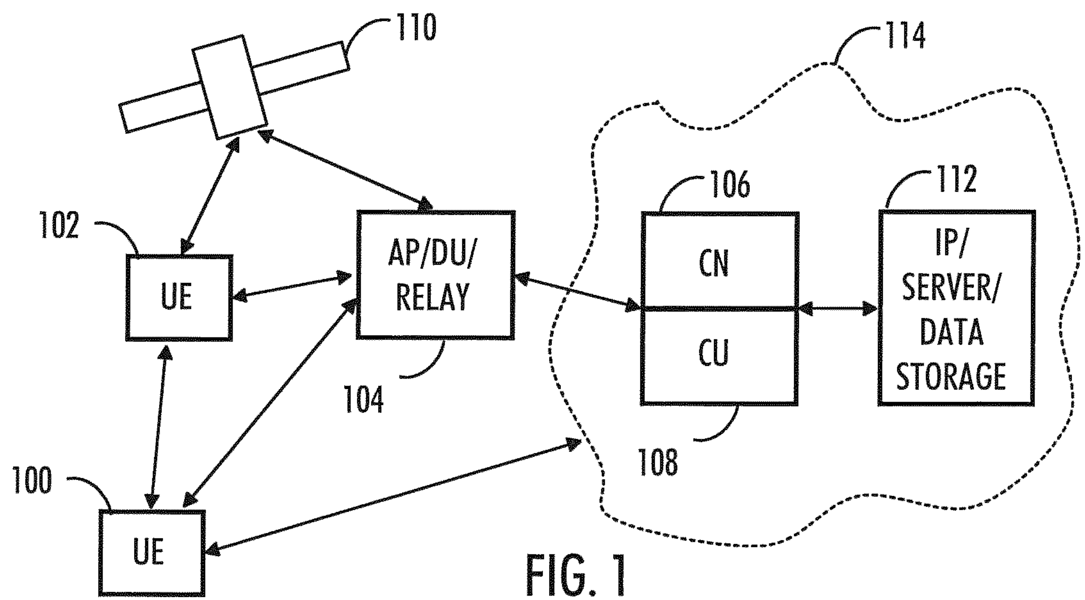
FIG. 1 illustrates a general architecture of an exemplary telecommunication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user terminals or devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for data and signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g) NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 106 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user terminal (also called UE, user equipment, user device, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user terminal typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user terminal may also be a device having capability to operate in Internet of Things (IoT) network which is a scenario in which objects are provided with the ability to transfer data over a network without requiring human-to-human or human-to-computer interaction. The user terminal may also utilise cloud. In some applications, a user terminal may comprise a small portable device with radio parts (such as a watch, earphones or eyeglasses) and the computation is carried out in the cloud. The user terminal (or in some embodiments a layer 3 relay node) is configured to perform one or more of user equipment functionalities. The user terminal may also be called a subscriber unit, mobile station, remote terminal, access terminal, user device or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented. 5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

In an embodiment, 5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 110 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of “plug-and-play” (e/g)NodeBs has been introduced. Typically, a network which is able to use “plug-and-play” (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator’s network may aggregate traffic from a large number of HNBs back to a core network.

As mentioned, radio access network may be split into two logical entities called Central Unit (CU) and Distributed Unit (DU). In prior art, both CU and DU supplied by the same vendor. Thus they are designed together and interworking between the units is easy. The interface between CU and DU is currently being standardized by 3GPP and it is denoted F1 interface. Therefore in the future the network operators may have the flexibility to choose different vendors for CU and DU. Different vendors can provide different failure and recovery characteristics for the units. If the failure and recovery scenarios of the units are not handled in a coordinated manner, it will result in inconsistent states in the CU and DU (which may lead to subsequent call failures, for example).

Thus there is a need to enable the CU and DU from different vendors to coordinate operation to handle failure conditions and recovery, taking into account the potential differences in resiliency capabilities between the CU and DU.

Monitoring quality of connections or radio carriers or radio signals between transceivers in a wireless communication system or radio access network is an important part of system maintenance. Propagation environment of connections between user terminals and base stations or access points is affected by many factors such as fading, multipath propagation and interference from other connections. Typically network maintenance personnel may obtain numerical information from existing connections, but as the number of connections the amount of data is large it may be difficult to perform analysis of the existing state of the connections quality in the network.

In an embodiment of the invention, radio carriers or radio signals between transceivers in a wireless communication, which are invisible for human eyes, are visualised with visual signal forms. The properties of the signal form illustrate different qualities or properties of the radio carriers or radio signals. In an embodiment, augmented or merged reality technologies are utilised in the visualization of the radio signals. The properties or quality of a radio signal may be observed in an intuitive way which requires no engineer skills or interpretation of multiple numeric values.

Figure 2:
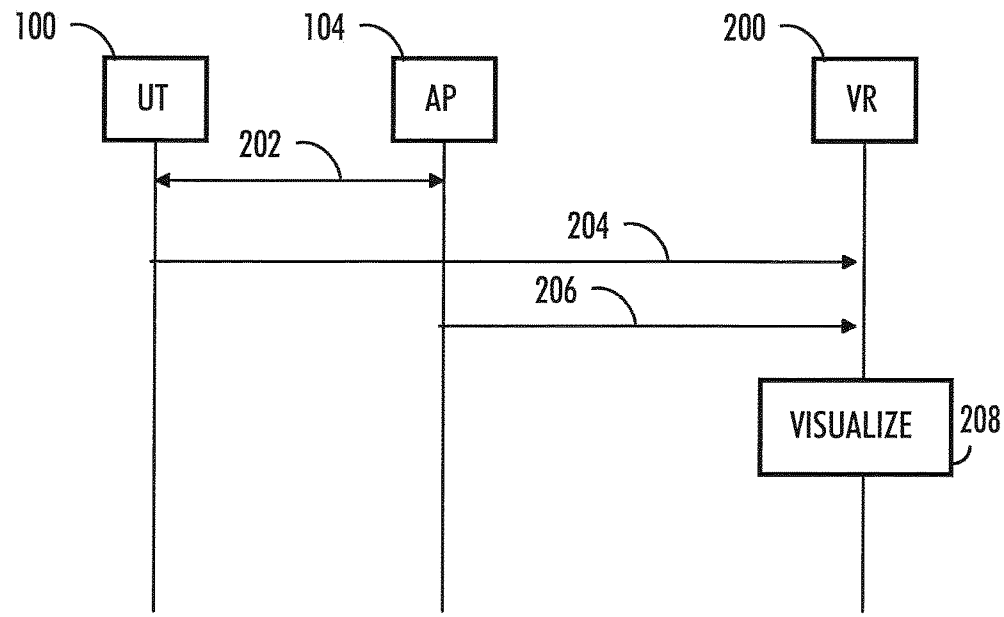
FIG. 2 is a signalling chart illustrating an example.

FIG. 2 is a signalling chart illustrating an example. A user terminal 100 is communicating with an access point 104 utilising radio signals or radio carriers 202. The user terminal 100 and/or the access point 104 may be configured to continuously determine radio frequency parameters related to one or more radio signals 202 received or transmitted by the user terminal and/or the access point transceiver, the parameters designating the quality and properties of the radio signals.

In an embodiment, the user terminal 100 and/or the access point are configured to continuously transmit the radio frequency parameters to a radio signal analyzation apparatus 200 comprising a receiver and a user interface. The radio signal analyzation apparatus 200 may be configured to continuously wirelessly receive 204, 206 from the user terminal 100 and access point 104 radio frequency parameters related to one or more radio signals received or transmitted by the user terminal and/or the access point.

The radio signal analyzation apparatus 200 may be further configured to transform the one or more radio signals to a corresponding number of signal wave forms having a given amplitude, frequency and smoothness where the amplitude, frequency and smoothness of each wave form is controlled based the received radio frequency parameters of the corresponding signal, and visualize the signal wave forms on a user interface of the apparatus.

In an embodiment, the received radio frequency parameters are discrete measurement results, and the radio signal analyzation apparatus is configured to transform the discrete measurement results to continuous wave forms.

Figure 3:
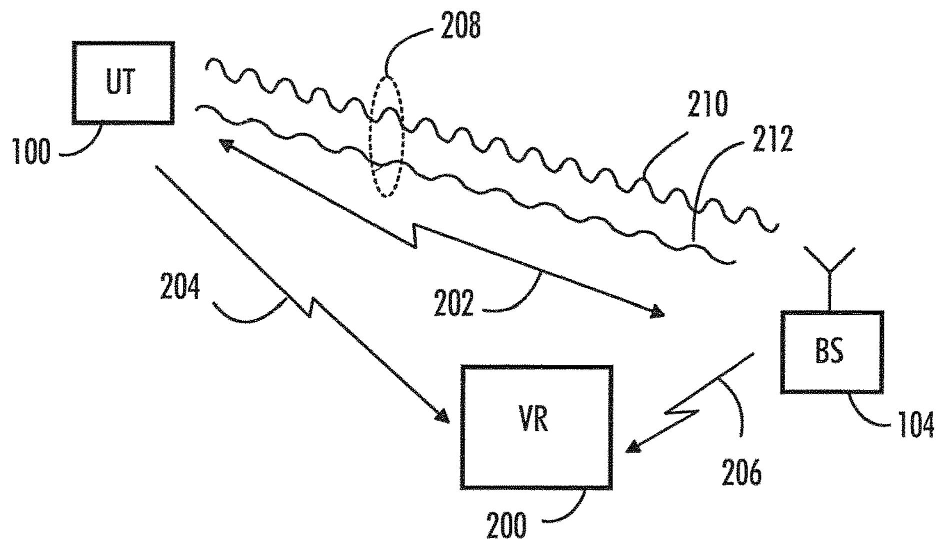
FIG. 3 illustrating an example embodiment.

FIG. 3 further illustrates the above example. FIG. 3 shows the user terminal 100 and the access point 104 communicating 202 with each other utilising radio signals or carriers. The user terminal and access point may be configured to determine radio frequency parameters related to one or more radio signals 202 received or transmitted by the user terminal and/or the access point transceiver and transmit 204, 206 the parameters continuously to the radio signal analyzation apparatus 200

The radio signal analyzation apparatus 200 may be configured to, based on the received radio frequency parameters, transform the one or more radio signals to a corresponding number of signal wave forms 208 and display the signals.

In an embodiment, the radio signals are transformed to a sinusoid wave form and visualized on a display of the radio signal analyzation apparatus or on a display operationally connected to the analyzation apparatus. The amplitude, frequency and smoothness of the sinusoid wave form may be controlled on the basis of received radio frequency parameters of the corresponding signal. The representation may show the signal 210 from the access point to the user terminal and the signal 212 from the user terminal to the access point.

Figure 4:
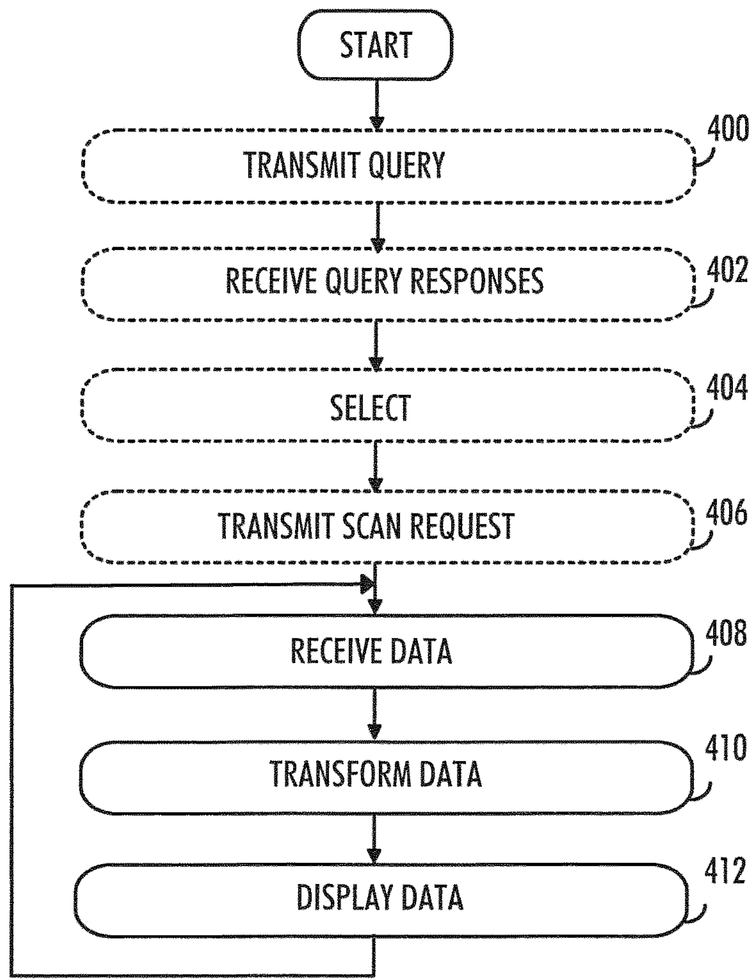
FIGS. 4 and 5 are flowcharts illustrating example embodiments.

The flowchart of FIG. 4 illustrates an example of an embodiment in an apparatus. The apparatus may be the radio signal analyzation apparatus 200. In step 400, the apparatus is configured to transmit to a set of transceivers a query to a obtain radio frequency parameters of one or more radio signals received or transmitted by each transceiver. The transceivers may be both user terminals and base stations or access points. The apparatus queries whether the transceivers are able or willing to transmit parameters to the apparatus.

In an embodiment, the apparatus is configured to determine one or more geographic areas, and transmit the query to transceivers located within the geographic areas. For example, the apparatus may transmit the query to all transceivers within a given distance, such as 50 m or 5000 m from the apparatus. The geographical area may be different for different types of transceivers. For example, for user terminals the area may be different compared to access point transceivers.

The apparatus may beforehand obtain information on the location of the transceivers. For example, if the apparatus is used in a real life situation, the apparatus may transmit a location query. If the apparatus is used in a simulation setup, the location information may be obtained from the simulation environment. Known methods may be utilised in obtaining location information. For example, the apparatus may receive location data from user terminals or access points or both. Satellite position systems may be utilised in determining location. Access points may determine location of the user terminals or indoor location methods may be utilised. In short, any known method may be utilised in obtaining location information.

In step 402, the apparatus is configured to, utilizing a receiver of the apparatus, receive from the one or more transceivers of the set a reply indicating the possibility to transmit radio frequency parameters.

In step 404, the apparatus is configured to, utilizing a processing unit of the apparatus, select from the one or more transceivers which indicated that they can transmit radio frequency parameters the radio signals which parameters are to be transmitted by the one or more transceivers. Thus, the apparatus may select some signals transmitted by one or more access points and some signals transmitted by one or more user terminals, for example.

In step 406, the apparatus is configured to, utilizing a transmitter of the apparatus, transmit to the one or more transceivers a request to transmit the parameters of the selected radio signals. Thus, the selected transceivers are informed that they can start transmission of parameters.

In step 408, the apparatus is configured to continuously wirelessly receive from one or more transceivers radio frequency parameters related to one or more radio signals received or transmitted by the transceivers. In an embodiment, parameters related to one or more radio signals may be one or more of the following: throughput, signal to noise ratio, frequency, transmission or reception direction, transceiver identification, transceiver location, signal quality indicator, for example.

In step 410, the apparatus is configured to, utilizing a processing unit of the apparatus, transform the one or more radio signals to a corresponding number of signal wave forms having a given amplitude, frequency and smoothness where the amplitude, frequency and smoothness of each wave form is controlled based on the received radio frequency parameters of the corresponding signal.

In an embodiment, the received radio frequency parameters are discrete measurement results. The radio signal analyzation apparatus may be configured to transform these received discrete measurement results to continuous wave forms. The transform step is further described below.

In step 410, the apparatus is configured to control a user interface of the apparatus to display one or more of the signal wave forms.

Thus, as the quality or other parameter of a radio signal or carrier changes over time, the change is reflected in the visualized wave form, and monitoring personnel may take needed actions, for example.

Figure 5:
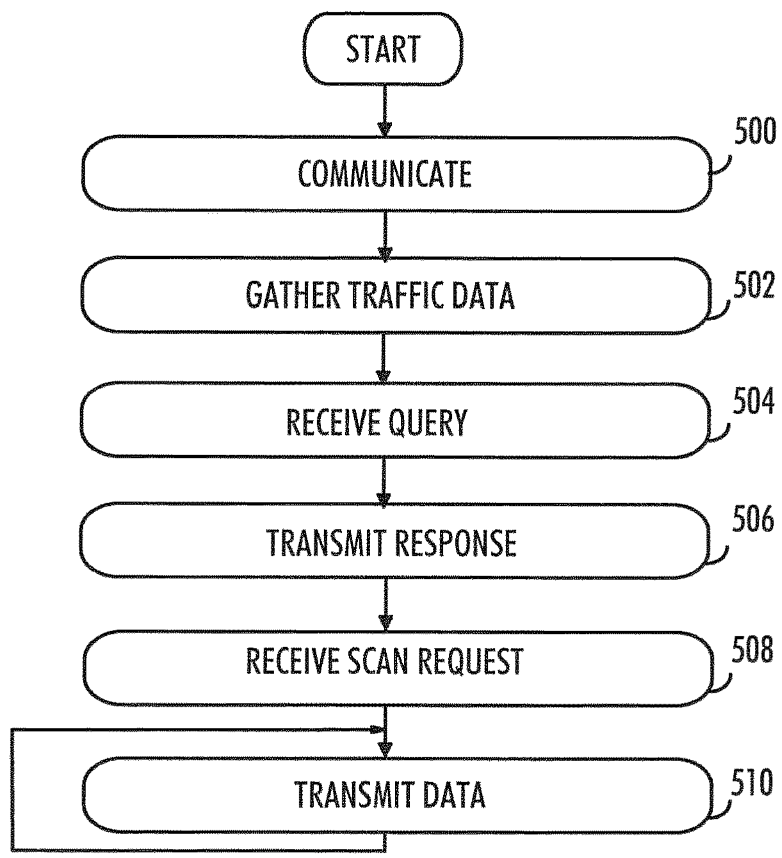

The flowchart of FIG. 5 illustrates an example of an embodiment in an apparatus. The apparatus may be a user terminal 100 and/or an access point 104, or a part of a user terminal and/or access point.

In step 500, the apparatus is configured to control a transceiver of the apparatus to transmit and/or receive one or more radio signals. The apparatus may communicate with one or more other transceivers, for example.

In step 502, the apparatus is configured to determine radio frequency parameters related to one or more radio signals received or transmitted by the transceiver as a function of time. The parameters may be, for example, throughput, signal to noise ratio, frequency, transmission or reception direction, transceiver identification, transceiver location, signal quality indicator.

In step 504, the apparatus is configured to receive from a device a query to a obtain radio frequency parameters of one or more radio signals received or transmitted by the apparatus. The device may be the radio signal analyzation apparatus 200.

In step 506, the apparatus is configured to transmit to the device a response indicating the possibility to transmit radio frequency parameters.

In step 508, the apparatus is configured to receive from the device a request to transmit the radio frequency parameters of the selected radio signals. In step 510, the apparatus is configured to continuously transmit to the device the radio frequency parameters.

The apparatus of FIG. 4, such as the radio signal analyzation apparatus 200, and the apparatus of FIG. 5, such as a user terminal 100 and/or an access point 104, or a part of a user terminal and/or access point. may communicate with each other with a suitable wireless radio connection, via a cellular connection (such as UMTS, LTE, NR, for example), via Wireless Local Area Network Connection (such as WiFi or WLAN) or via Bluetooth® or other radio connection known in the art.

Figure 6A:
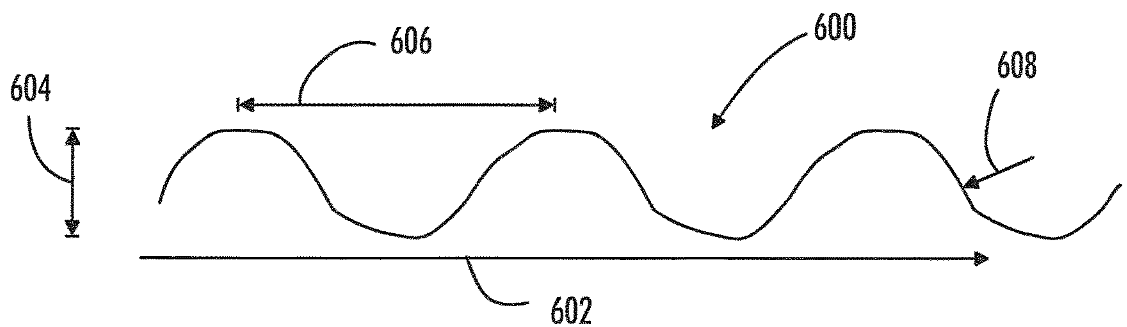
FIGS. 6A and 6B illustrate an example of transforming a radio signal to a signal wave form.
Figure 6B:
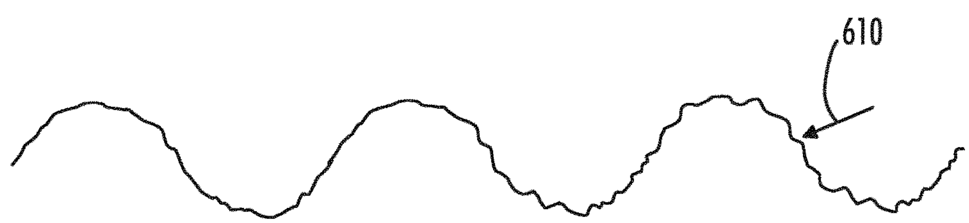

FIGS. 6A and 6B illustrate an example of how the transform of a radio signal to a signal wave form based on the received radio frequency parameters may be performed. FIG. 6A shows mapping of a given radio signal to a signal wave form 600. The signal propagates in the direction of the x-axis 602. In this example the signal wave form in sinusoidal, but other wave forms are also possible. The selection of the wave form may be a programmable parameter or based on user selection, for example.

The signal wave form has a given amplitude, frequency and smoothness. In an embodiment, the radio frequency parameters comprise throughput, signal to noise ratio, frequency (or other suitable signal quality indicator), among others.

In an embodiment, the amplitude 604 of the wave form is controlled based on the throughput of the radio signal. The correspondence of the actual throughput of the radio signal to the amplitude of the wave form may be a programmable or a user selectable parameter. In an embodiment, the better the throughput, the larger the amplitude.

In an embodiment, the wavelength 606 of the sinusoid is controlled based on the frequency of the radio signal. The correspondence of the actual radio frequency to the wavelength of the wave form may be a programmable or a user selectable parameter. In an embodiment, the radio frequency 3.5 GHz may be mapped to a wavelength eight times longer as the radio frequency of 28 GHz.

In an embodiment, the smoothness 608, 610 of the sinusoid is controlled based on the signal to noise ratio (or other signal quality parameter) of the radio signal. In the example of FIG. 6A, the received signal to noise ratio of the radio signal is good and thus the wave form is smooth. In the example of FIG. 6B, the received signal to noise ratio of the radio signal is poor and thus the wave form is not smooth. The correspondence of signal to noise ration of the radio signal to the smoothness of the wave form may be a programmable or a user selectable parameter. In an embodiment, the smoother the signal the better the signal to noise ratio is.

If the signal wave form is displayed on user interface, the user may easily monitor in real time the quality of the selected radio signals or radio carriers. Instead of discrete numerical values, continuous wave forms are produced based on the numerical measurement results. Any possible deviations from desired quality of service may be monitored and detected quickly. The direction of the wave may indicate whether it is an uplink or downlink signal.

In an embodiment, the radio signal analyzation apparatus may be configured to obtain a visual presentation of the one or more geographic areas in which scan of radio signals is to be performed. The visual presentation may be based on a generated three dimensional (3D) map of a given area or it may be a result of a video capture, or obtained otherwise.

The visual presentation may be shown in the user interface of the apparatus. In an embodiment, the visual presentation may be a scene seen through virtual reality (VR) or augmented reality (AR) glasses worn by a user.

In an embodiment, the radio signal analyzation apparatus may be further configured to locate the one or more transceivers within the one or more geographic areas and indicate the one or more transceivers in the visual presentation. Thus, a user may see in the visual presentation where the transceivers are located.

Figure 7:
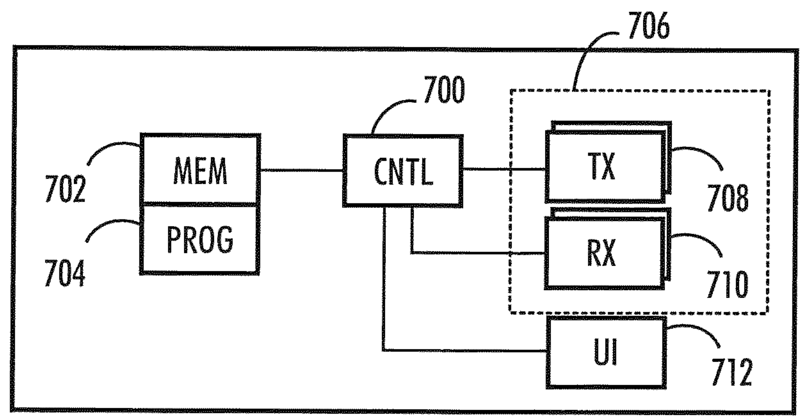
FIGS. 7, 8 and 9 illustrate simplified examples of apparatuses in which some embodiments of the invention may be applied.

In an embodiment, the radio signal analyzation apparatus may be further configured to control the user interface to display wave forms of the one or more transceivers starting from or ending to the one or more transceivers. Thus a visual presentation describing the quality of invisible radio signals is obtained FIG. 7 illustrates an embodiment. The figure illustrates a simplified example of the radio signal analyzation apparatus 200 or a part of the apparatus.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities. For example, the apparatus may be realized using cloud computing or distributed computing with several physical entities located in different places but connected with each other.

The apparatus of the example includes a processing unit or a control circuitry (CNTL) 700 configured to control at least part of the operation of the apparatus.

The apparatus may comprise a memory (MEM) 702 for storing data. Furthermore the memory may store software or applications 704 executable by the processing unit 700. The memory may be integrated in the processing unit.

The processing unit 700 is configured to execute one or more applications. The applications may be stored in the memory 704.

The apparatus may further comprise radio interface 706 operationally connected to the processing unit 700. The radio interface may be connected to an antenna or a set of antennas (not shown). The radio interface may comprise one or more transmitters (TX) 708 and one or more receivers (RX) 710. The transmitters and receivers may be realized with transceivers, as one skilled in the art is aware. The one or more transmitters and receivers may operate using various radio technologies, such as cellular, local area network and Bluetooth® technologies.

The apparatus may further comprise user interface (UI) 712. The user interface may comprise one or more displays which may be touch sensitive, a microphone, a camera, a keyboard, for example.

In an embodiment, the apparatus of FIG. 7 may be a mobile phone, a tablet, a computer, virtual reality (VR) or augmented reality (AR) glasses, for example.

Figure 8:
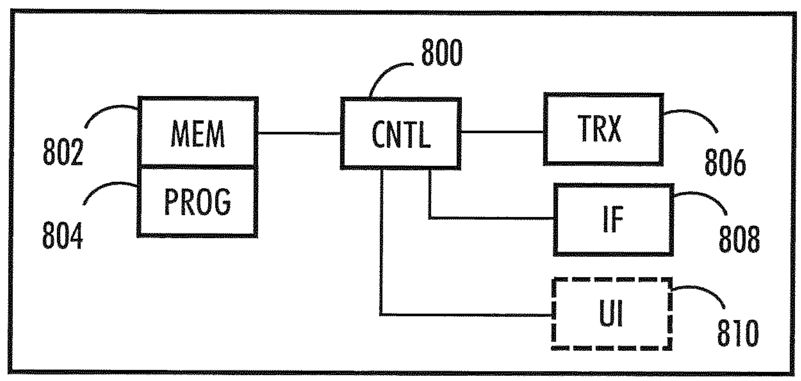

FIG. 8 illustrates an embodiment. The figure illustrates a simplified example of an apparatus applying embodiments of the invention. In some embodiments, the apparatus may be a user terminal or a part of a user terminal. In some embodiments, the apparatus may be a base station, access point, a part of a user terminal or a part of a base station or an access point.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry (CNTL) 800 configured to control at least part of the operation of the apparatus.

The apparatus may comprise a memory (MEM) 802 for storing data. Furthermore the memory may store software 804 executable by the control circuitry 700. The memory may be integrated in the control circuitry.

The control circuitry 800 is configured to execute one or more applications. The applications may be stored in the memory 804.

The apparatus comprises a transceiver (TRX) 806. The transceiver is operationally connected to the control circuitry 800. It may be connected to an antenna arrangement (not shown).

In an embodiment, the apparatus may comprise one or more interface circuitries (IF) 808. The interface circuitry is operationally connected to the control circuitry 800. The interface circuitry may be a communication interface configured to communicate with other network elements of the communication system with wired or wireless links.

In an embodiment, the apparatus may further comprise user interface circuitry (UI) 810 configured to enable user of the apparatus to communicate with the apparatus. The user interface may comprise a microphone, a speaker, a display which may be touch sensitive, a keyboard (which may be realized with the touch sensitive display) and other devices known in the art. connect the apparatus to other devices and network elements of communication system, for example to other corresponding apparatuses and network elements, such as the Core Network. The interface may provide a wired or wireless connection to the communication network.

Figure 9:
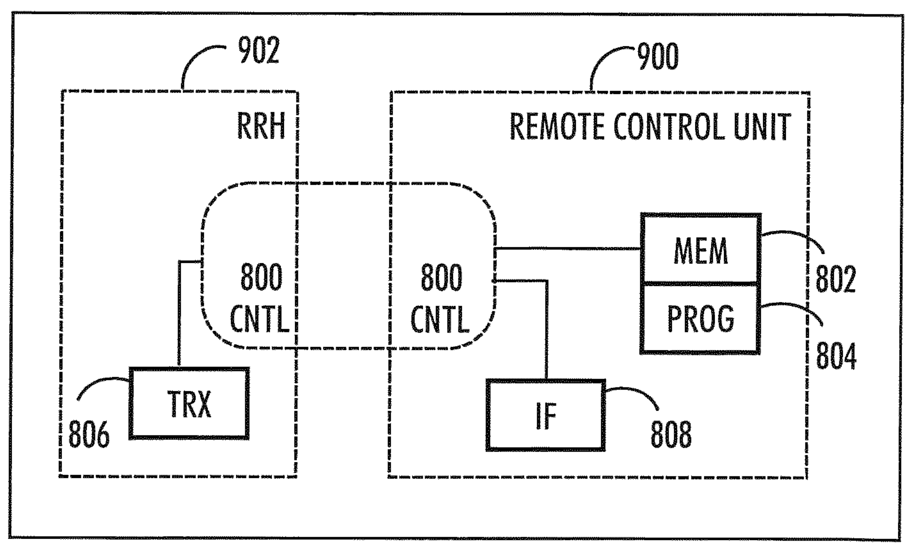

In an embodiment, as shown in FIG. 9, at least some of the functionalities of the apparatus of FIG. 8 may be shared between two physically separate devices, forming one operational entity. Therefore, the apparatus may be seen to depict the operational entity comprising one or more physically separate devices for executing at least some of the described processes. Thus, the apparatus of FIG. 9, utilizing such shared architecture, may comprise a remote control unit (RCU) 900, such as a host computer or a server computer, operatively coupled (e.g. via a wireless or wired network) to a remote radio head (RRH) 902 located in the base station. In an embodiment, at least some of the described processes may be performed by the RCU 900. In an embodiment, the execution of at least some of the described processes may be shared among the RRH 902 and the RCU 900.

In an embodiment, the RCU 900 may generate a virtual network through which the RCU 900 communicates with the RRH 902. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, or a circuitry which may comprise a working memory (RAM), a central processing unit (CPU), and a system clock. The CPU may comprise a set of registers, an arithmetic logic unit, and a controller. The controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a non-transitory distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, comprising:

one or more processors; and one or more memories storing instructions that, when executed by the one or more processors, cause the apparatus at least to perform:

receiving wirelessly from one or more transceivers radio frequency parameters related to one or more radio signals received or transmitted by the one or more transceivers, the received radio frequency parameters designating quality and properties of the radio signals;

transforming the one or more radio signals to a corresponding number of signal wave forms having a given amplitude, frequency and smoothness where the amplitude, frequency and smoothness of each signal wave form is controlled based on the received radio frequency parameters of a corresponding radio signal;

displaying the one or more of the signal wave forms;

transmitting to a set of transceivers a query to obtain radio frequency parameters of one or more radio signals received or transmitted by each transceiver;

receiving from the one or more transceivers of the set a reply indicating a possibility to transmit radio frequency parameters;

selecting from the one or more transceivers of the set the radio signals which properties are to be transmitted by the one or more transceivers; and transmitting to the one or more transceivers a request to transmit the radio frequency parameters of the selected radio signals.

2. The apparatus of claim 1, wherein the received radio frequency parameters are discrete measurement results, and wherein the one or more memories further store instructions that, when executed by the one or more processors, cause the apparatus at least to perform: transforming the discrete measurement results to continuous wave forms.

3. The apparatus of claim 1, wherein radio frequency parameters related to one or more radio signals comprise one or more of the following: throughput, signal to noise ratio, frequency; transmission or reception direction, transceiver identification, transceiver location, or signal quality indicator.

4. The apparatus of claim 1, wherein the signal wave forms are sinusoids and the amplitude of individual ones of the sinusoids is controlled on a basis of throughput of a corresponding radio signal.

5. The apparatus of claim 1, wherein the signal wave forms are sinusoids and the smoothness of individual ones of the sinusoids is controlled on a basis of a signal to noise ratio of a corresponding radio signal.

6. The apparatus of claim 1, wherein the signal wave forms are sinusoids and a wavelength of individual ones of the sinusoid is controlled on a basis of the frequency of a corresponding radio signal.

7. An apparatus, comprising:

one or more processors; and one or more memories storing instructions that, when executed by the one or more processors, cause the apparatus at least to perform:

receiving wirelessly, from one or more transceivers, radio frequency parameters related to one or more radio signals received or transmitted by the one or more transceivers, the received radio frequency parameters designating quality and properties of the radio signals;

transforming the one or more radio signals to a corresponding number of signal wave forms having a given amplitude, frequency and smoothness where the amplitude, frequency and smoothness of each signal wave form is controlled based on the received radio frequency parameters of a corresponding radio signal;

displaying the one or more of the signal wave forms;

determining one or more geographic areas; and transmitting a query to a set of transceivers located within the one or more geographic areas to obtain parameters of one or more radio signals received or transmitted by individual ones of the transceivers in the set.

8. The apparatus of claim 7, wherein the one or more memories further store instructions that, when executed by the one or more processors, cause the apparatus at least to perform:

obtaining and displaying on a user interface a visual presentation of the one or more geographic areas;

locating the one or more transceivers within the one or more geographic areas;

indicating the one or more transceivers in the visual presentation; and controlling the user interface to display the one or more radio signals of the one or more transceivers as wave folios starting from or ending to the one or more transceivers.

9. A method in an apparatus, comprising:

receiving wirelessly from one or more transceivers radio frequency parameters related to one or more radio signals received or transmitted by the one or more transceivers, the received radio frequency parameters designating quality and properties of the radio signals;

transforming the one or more radio signals to a corresponding number of signal wave forms having a given amplitude, frequency and smoothness where the amplitude, frequency and smoothness of each signal wave form is controlled based on the received radio frequency parameters of the corresponding radio signal;

displaying the one or more of the signal wave forms;

transmitting to a set of transceivers a query to obtain radio frequency parameters of one or more radio signals received or transmitted by each transceiver;

receiving from the one or more transceivers of the set a reply indicating a possibility to transmit radio frequency parameters;

selecting from the one or more transceivers of the set the radio signals which properties are to be transmitted by the one or more transceivers; and transmitting to the one or more transceivers a request to transmit the radio frequency parameters of the selected radio signals.

10. The method of claim 9, wherein the received radio frequency parameters are discrete measurement results, and the method further comprises transforming the discrete measurement results to continuous wave forms.

11. The method of claim 9, further comprising determining one or more geographic areas, and controlling the transmission of the query to transceivers located within the geographic areas.

12. The method of claim 11, further comprising:

obtaining and displaying on a user interface a visual presentation of the one or more geographic areas;

locating the one or more transceivers within the one or more geographic areas;

indicating the one or more transceivers in the visual presentation; and controlling the user interface to display the one or more radio signals of the one or more transceivers as wave forms starting from or ending to the one or more transceivers.

13. The method of claim 9, wherein radio frequency parameters related to one or more radio signals comprise one or more of the following: throughput, signal to noise ratio, frequency, transmission or reception direction, transceiver identification, transceiver location, or signal quality indicator.

14. The method of claim 9, wherein the signal wave forms are sinusoids and the amplitude of individual ones of the sinusoids is controlled on a basis of throughput of a corresponding radio signal.

15. The method of claim 9, wherein the signal wave forms are sinusoids and the smoothness of individual ones of the sinusoids is controlled on a basis of a signal to noise ratio of a corresponding radio signal.

16. The method of claim 9, wherein the signal wave forms are sinusoids and a wavelength of individual ones of the sinusoid is controlled on a basis of the frequency of a corresponding radio signal.

17. A computer-readable and non-transitory medium comprising program instructions that, when executed by an apparatus, cause the apparatus at least to perform the method of claim 9.

* * * * *